United States Patent [19]

Fenander

[11] Patent Number: 5,292,221
[45] Date of Patent: Mar. 8, 1994

[54] APPARATUS FOR MOVING A PLURALITY OF PALLETS LOADED WITH BUILDING BLOCKS

[75] Inventor: Jaymes K. Fenander, Vancouver, Wash.

[73] Assignee: Columbia Machine, Inc., Vancouver, Wash.

[21] Appl. No.: 745,931

[22] Filed: Aug. 16, 1991

[51] Int. Cl.⁵ ............................................. B65G 7/12
[52] U.S. Cl. .................................. 414/744.3; 384/620; 414/283; 414/609; 414/744.4
[58] Field of Search ................... 384/620; 414/744.2, 414/744.3, 744.4, 623, 626, 281, 283, 609, 744.1, 592

[56] References Cited

U.S. PATENT DOCUMENTS

| | | | |
|---|---|---|---|
| 1,491,771 | 4/1924 | Fuller | 414/281 X |
| 2,624,470 | 1/1953 | Geist | 414/626 X |
| 2,869,734 | 1/1959 | Ernestus | 414/281 X |
| 4,541,769 | 9/1985 | Clemens | 414/283 X |

Primary Examiner—Michael S. Huppert
Assistant Examiner—Janice Krizek
Attorney, Agent, or Firm—Alan T. McCollom

[57] ABSTRACT

Apparatus for moving a plurality of pallets loaded with building block and being supported in a vertical stack in parallel relation to one another. Uncured molded block is supported on pallets which are serially advanced on a conveyor toward an unloader. Pallets are arranged in a vertical stack for engagement with an unloader spade assembly having a plurality of laterally extending spades one above the other. The spades are constructed to support and lift the pallets when each is positioned under a corresponding pallet and the spade assembly is shifted upwardly. A transfer carriage is mounted on a track above the spade assembly for lateral shifting movement with the spade assembly being suspended therefrom. A pivot shaft is mounted on the transfer carriage for pivoting about a vertical axis and includes a driving end connected to the spade assembly for pivoting the spade assembly about the axis. Rollers are mounted on the transfer carriage. The spade assembly has a wear ring mounted thereon which rides on the roller means. The wear ring is removable while the spade assembly remains supported by the rollers on the transfer carriage.

22 Claims, 11 Drawing Sheets

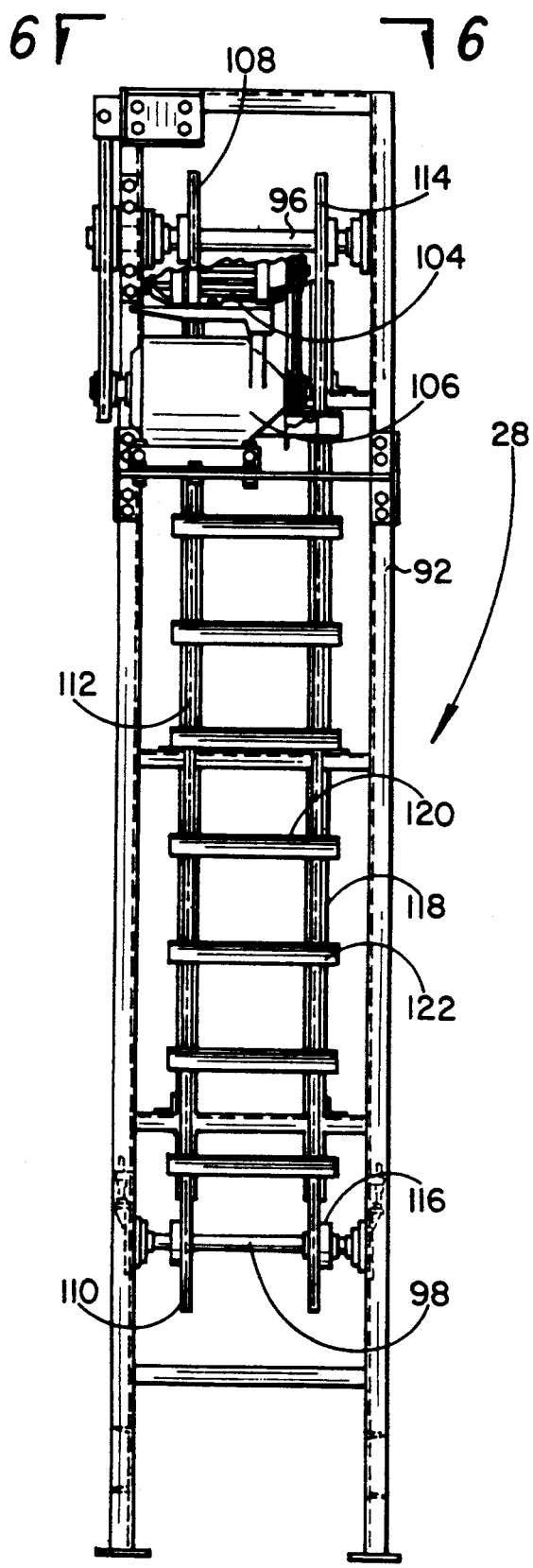
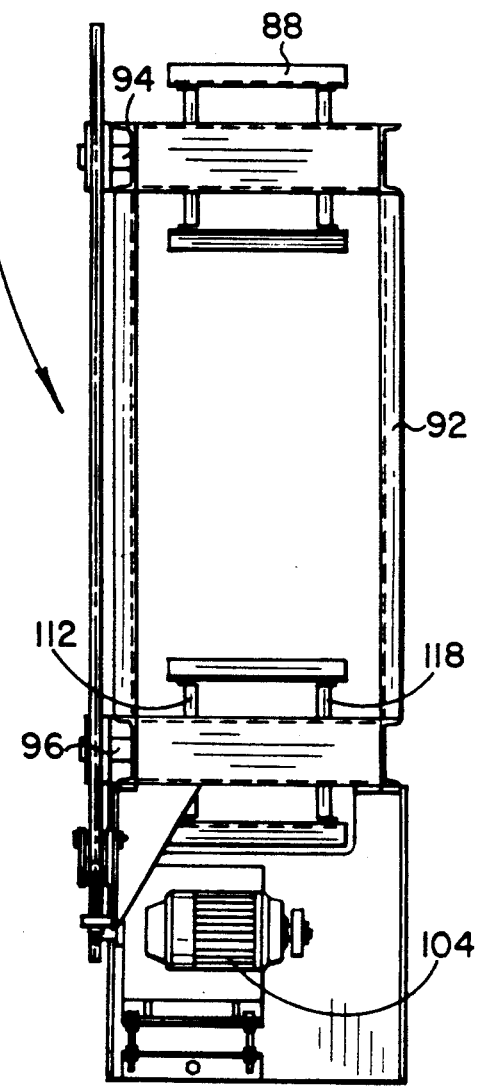
Fig. 5
Fig. 6

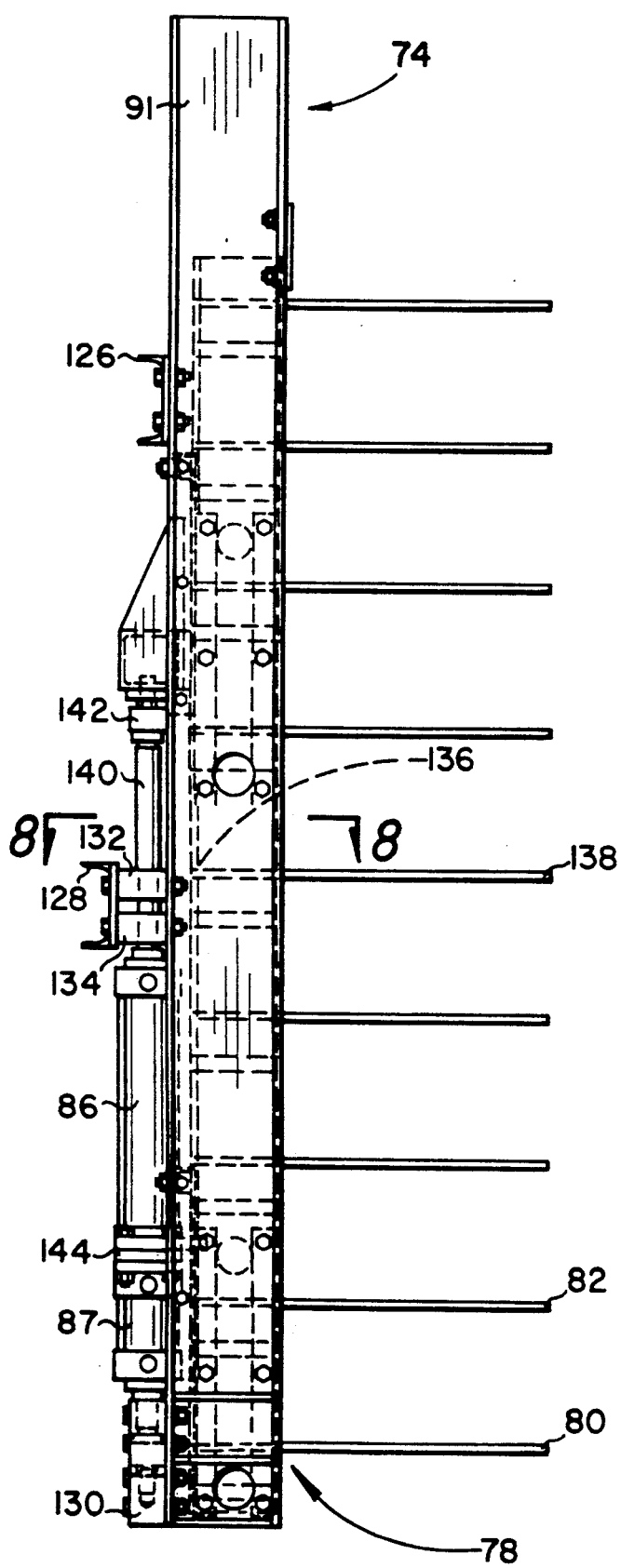
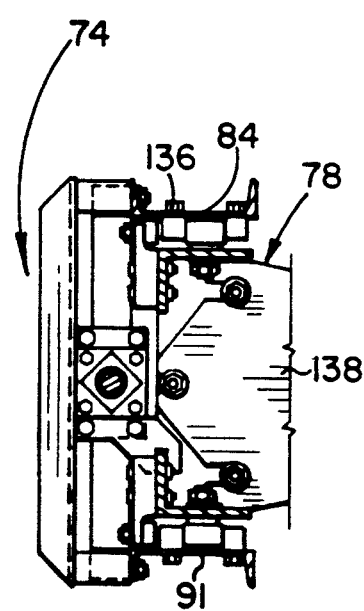
Fig. 7
Fig. 8

APPARATUS FOR MOVING A PLURALITY OF PALLETS LOADED WITH BUILDING BLOCKS

BACKGROUND OF THE INVENTION

1. Field of the Invention

The present invention relates to apparatus for moving a plurality of pallets loaded with building blocks and more particularly to such apparatus which includes a plurality of horizontal spades adapted for vertical, lateral and rotational shifting of a corresponding plurality of loaded pallets and having an improved rotation mechanism.

2. Description of the Related Art

In automated brick or block making plants, a block machine presses moldable product into a block mold to produce green or uncured blocks. The green blocks are transported to kilns for curing and are thereafter palletized for shipment from the plant.

Usually the block molding machine dispenses a plurality of green blocks on a rectangular metal pallet. The pallets are transported by conveyor to a stacker tower which receives the pallets, one at a time. After a pallet is received by the stacker at the level of the conveyor, the stacker shifts the pallet upwardly and then receives another pallet loaded with block directly therebeneath. This process continues until a vertical stack of pallets, typically about 8-10 in number, are held by the stacker.

The stacker is positioned adjacent a device known as a loader. The loader comprises a vertically-shiftable spade assembly from which a plurality of spades, positioned one above the other, extend laterally. There are the same number of spades in the loader as pallets with the spades being spaced apart from one another the same distance as the pallets in the stacker.

The spades are mounted on a vertical post which extends downwardly from a carriage that is laterally moveable along an axis toward and away from the stacker. The post is connected to the carriage via a ball bearing having a diameter in excess of one foot. An hydraulic rotary actuator mounted on the carriage pivots the spade assembly about a vertical axis. A pair of hydraulic rams are mounted on the spade assembly for vertically shifting the spade assembly in a manner which causes the spades to shift in tandem either upwardly or downwardly.

In operation, when the stacker is filled with loaded pallets, the loader carriage drives the spade assembly toward the stacker until each spade is received just beneath a corresponding pallet. One of the rams on the spade assembly actuates to shift the spades upwardly thereby lifting the pallets. The carriage then withdraws from the stacker, rotates 180° and advances toward a rack positioned at the other end of the spade assembly travel path. The carriage moves the spade assembly bearing the loaded pallets into the rack and a ram on the spade assembly actuates thereby lowering the assembly and depositing the stacked pallets on the rack.

Thereafter, either by way of a forklift or on automated transport cars, the racks are moved into kilns for curing.

After the blocks are cured, the racks are removed from the kilns and transported to a second stacker and unloader which operate in reverse fashion from the stacker and loader as described above and are referred to as an unloader and unstacker. The unloader carriage moves toward the rack bearing the cured block and positions a spade under each pallet. The ram on the spade assembly actuates thereby raising the spade assembly and the corresponding pallets which are then transported laterally by the unloader carriage toward the unstacker. Prior to reaching the unstacker the spade assembly rotates 180° and thereafter drives into the unstacker and deposits the pallets thereon. The unstacker lowers each pallet, one at a time, onto a conveyor which transports the cured block to a palletizing station prior to shipment.

The prior art loader and unloader suffer from several disadvantages which will be described with reference only to the loader because, as set forth above, the loader and unloader are structurally identical but differ in the manner in which each is operated. The large ball bearing in the prior art unloader absorbs the entire load of the spade assembly and blocks supported thereon. This imparts a substantial amount of wear to the ball bearing which must be replaced on a periodic basis. Replacement is both expensive and cumbersome because the entire spade assembly must be removed to replace the ball bearing. In addition, the ball bearing does not provide a stable suspension for resisting wobbling of the spade assembly as the carriage starts and stops.

SUMMARY OF THE INVENTION

The present invention comprises apparatus for moving a plurality of pallets loaded with building blocks which are supported in a vertical stack in parallel relation to one another. A spade assembly having a plurality of laterally extending spades one above the other is constructed to support and lift the pallets when each spade is positioned under a corresponding pallet and the pallet assembly is shifted upwardly. The spade assembly is suspended from a transfer carriage which is mounted on a track for laterally shifting movement. Means are provided for pivoting the spade assembly about a vertical axis. A wear ring is mounted on the spade assembly and rides on roller means which are mounted on the transfer carriage. Means are provided for removing the wear ring while the spade assembly remains suspended from the transfer carriage.

It is a general object of the present invention to provide apparatus for moving a plurality of pallets loaded with building blocks which overcomes the disadvantages associated with prior art apparatus.

It is a more specific object of the present invention to provide such an apparatus which permits removal of components which rotate and support the spade assembly while it remains suspended from the transfer carriage.

It is another specific object of the present invention to provide such an apparatus without using a ball bearing.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 5 is a side elevational view of the stacker.

FIG. 6 is a view taken along line 6—6 in FIG. 5.

FIG. 7 is a side elevational view of the spade assembly of the loader of FIGS. 2 and 3.

FIG. 8 is a view taken along line 8—8 in FIG. 7.

DETAILED DESCRIPTION OF THE PREFERRED EMBODIMENT

Figure 1:
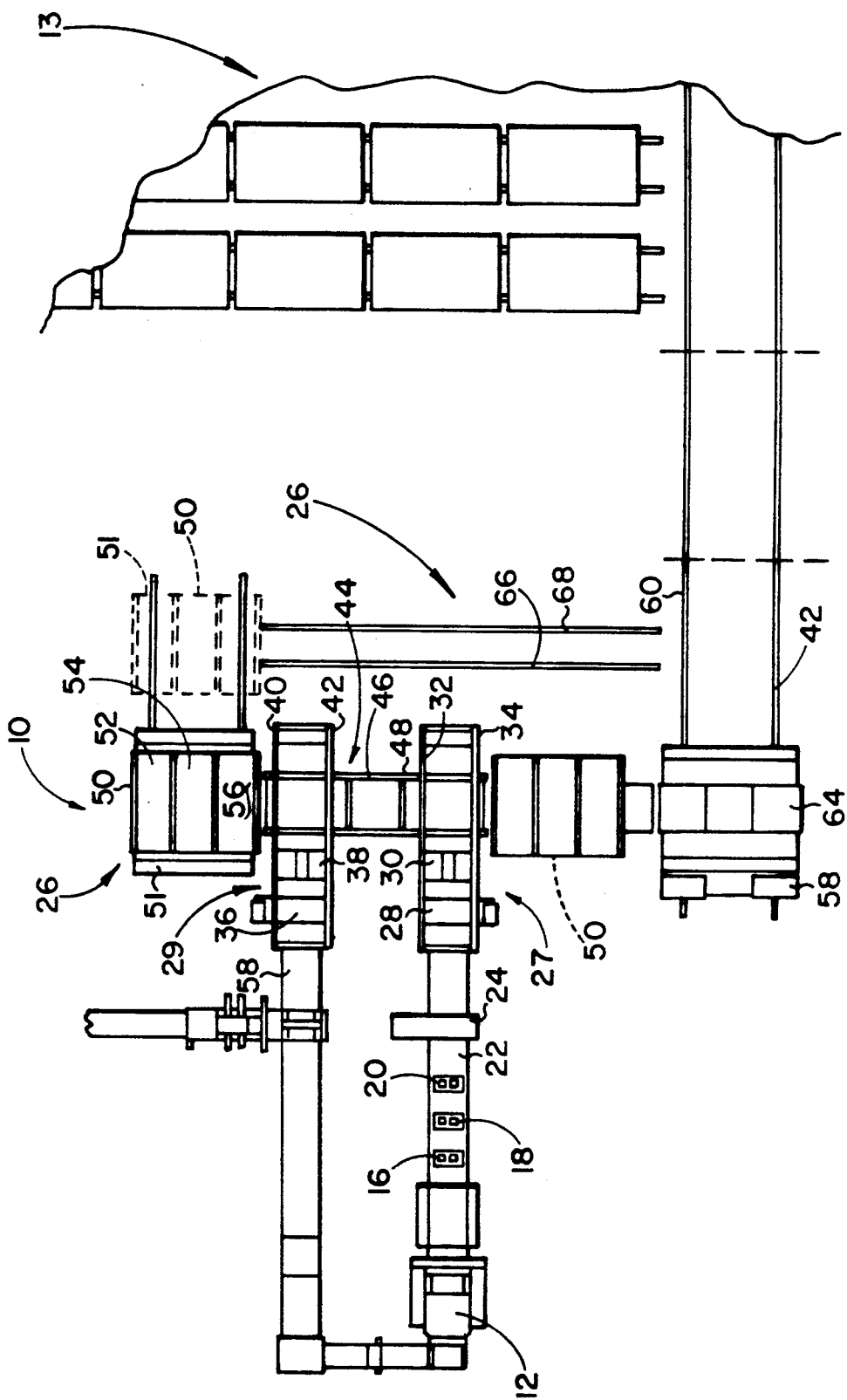
FIG. 1 is a schematic plan view of an automated block-making factory incorporating the present invention.

Considering now the drawings, and particularly FIG. 1, indicated generally at 10 is an automated concrete block manufacturing plant. Included therein is a block machine 12. The block machine is commercially available and is the type which receives mixed concrete product on a conveyor or the like (not shown) and compresses the same into a mold thereby forming green or uncured concrete blocks. The green blocks must be cured in a heated kiln, indicated generally at 13, for a predetermined time period before they can be shipped from the plant.

The green blocks are dispensed from machine 12 on substantially planar rectangular steel pallets, like pallets 16, 18, 20. Pallets 16, 18, 20 are supported on a conveyor 22 which transports the pallets from block machine 12 through a bad block reject station 24 and to a multitier loader system constructed in accordance with the present invention and indicated generally a 26. System 26 includes a green block station, indicated generally at 27, and a cured block station, indicated generally at 29. Included in green block station 27 is a pallet stacker 28 and a loader 30, which is laterally shiftable on overhead rails 32, 34 toward and away from stacker 28.

Cured block station 29 includes an unstacker 36 and an unloader 38 mounted on a pair of overhead rails 40, 42 for laterally shifting toward and away from unstacker 36. As will later be described in more detail, stacker 28 and loader 30, on the one hand, are substantially identical to unstacker 36 and unloader 38, on the other hand.

A rack transfer device 44 includes a pair of rails 46, 48 mounted on the floor of plant 10 and extending into cured block station 29 at one end and into green block station 27 at the other end thereof. The rack transfer device operates in a known manner to sequence a rack loaded with cured block, like rack 50, first, through cured block station 29.

Rack 50 is supported on a side shift assembly 51. The side shift assembly is laterally shiftable between the solid-line view of rack 50 and assembly 51 and the adjacent dashed-line view.

Rack transfer device 44 engages rack 50 when the rack and side shift assembly 51 are in the solid-line position. As transfer device 44 sequences rack 50 through cured block station 29, unloader 38 unloads vertical stacks of pallets having cured block thereon from the rack and transfers the stacks to unstacker 36. Rack 50 includes three bays 52, 54, 56 each having several rows of vertically stacked pallets with each stack being removed, one at a time until each bay is empty. Unstacker 36 deposits each pallet, one at a time on a conveyor 58 which transports the blocks to additional stations where they are palletized for shipment. When rack 50 is empty, rack transfer device 44 continues sequencing the rack along rails 46, 48 and into green block station 27 where each bay is loaded with vertical stacks of green block by loader 30. The loader transfers pallets, a single vertical stack at a time, from stacker 28 into a bay of the rack. Finally, rack 50, fully loaded with green block moves under the action of rack transfer device 44 to the dashed line position for rack 50 shown adjacent green block station 27.

A platform transfer car 58 is moveable laterally along a pair of rails 60, 62. A rack transporter car 64 is supported on transfer car 58 and is driveable on and off of the transfer car along an axis normal to rails 60, 62. Car 64 is constructed in a known manner to drive beneath a rack, like rack 50, and thereafter raise it for transporting the rack to and from car 58. In this manner racks of green blocks are loaded, one at a time, onto car 58 and transported into kiln 13. Car 64 thereafter drives off of car 58 and deposits the rack in the kiln. A rack of cured block may thereafter be picked up by car 64 which is driven onto car 58. Car 58 thereafter exits kiln 13 and aligns itself with rails 66, 68. Car 64 transports the cured block along rails 66, 68 to side shift assembly 51, when assembly 51 is in the dashed-line position, upon which the cured block is deposited. Thereafter the side shift assembly moves to the solid-line position where rack 50 is engaged by rack transfer device 44 for unloading cured block from the rack as described above.

Figure 2:
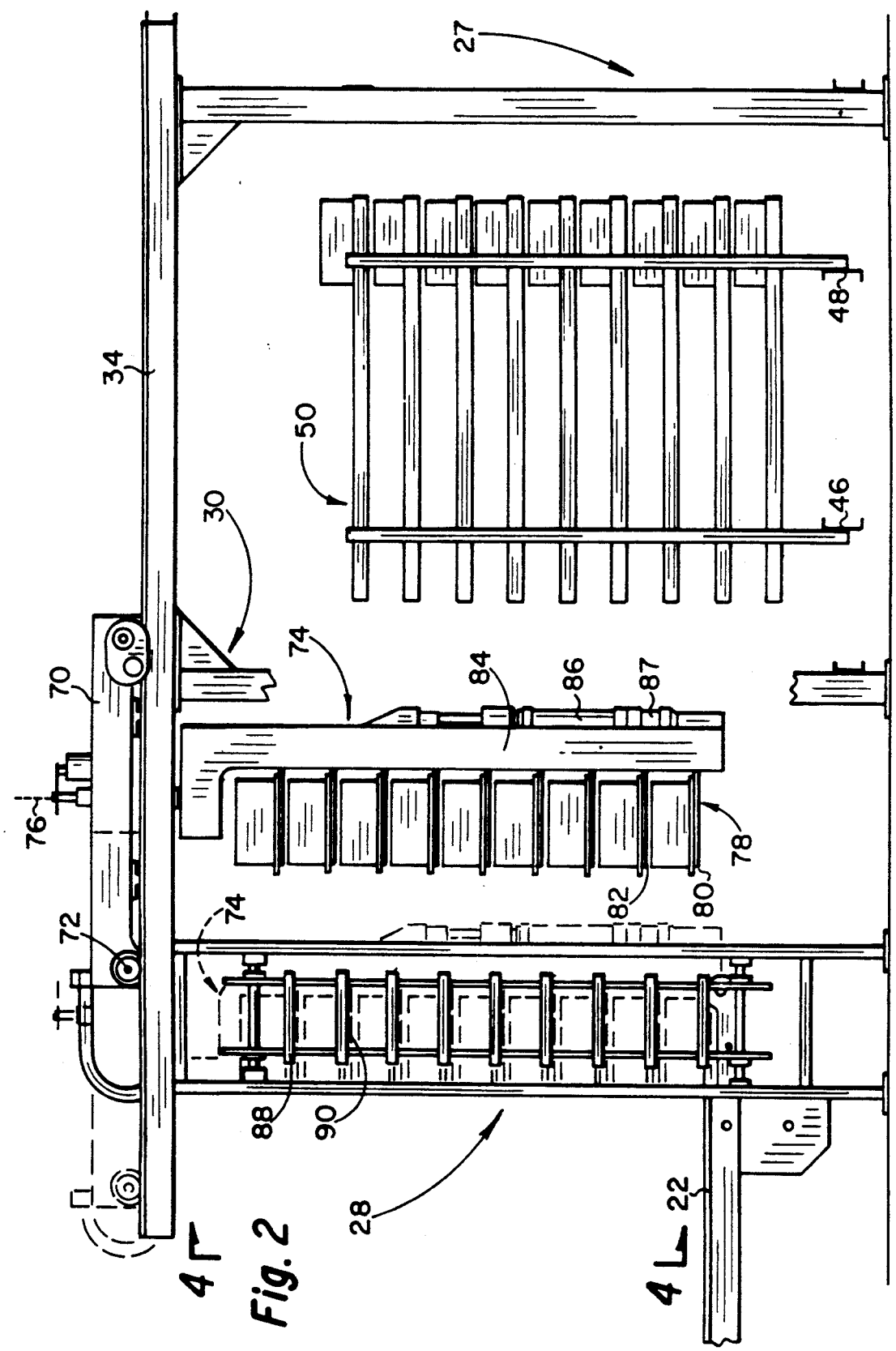
FIG. 2 is a side elevational view of structure in FIG. 1 showing the loader removing green block from the stacker.

Turning now to FIG. 2, structure which has been previously identified in FIG. 1 retains the corresponding identifying numeral. Loader 30 includes a transfer carriage 70 having four wheels, one of which is wheel 72, which are engaged with rails 32, 34 for facilitating movement of carriage 70 therealong. A spade tree assembly 74 is suspended from carriage 70 between rails 32, 34. As will later be described in more detail, spade tree assembly 74 is pivotable about a vertical axis 76.

Assembly 74 further includes a spade tree 78. The spade tree includes a plurality of laterally extending spades, like spades 80, 82. In the view of FIG. 2 each spade supports a pallet having uncured blocks thereon. As will later be described in more detail, spade tree 78 comprises a rigid unit which is vertically shiftable relative to opposed, parallel side channels, one of which is side channel 84. A pair of rams 86, 87 is mounted on assembly 74 in a manner which is described in more detail hereinafter. Actuation of ram 86 vertically shifts spade tree 78 relative to the side channels. Actuation of ram 87 also shifts the spade tree relative to the side channels but by a lesser amount.

Figure 4:
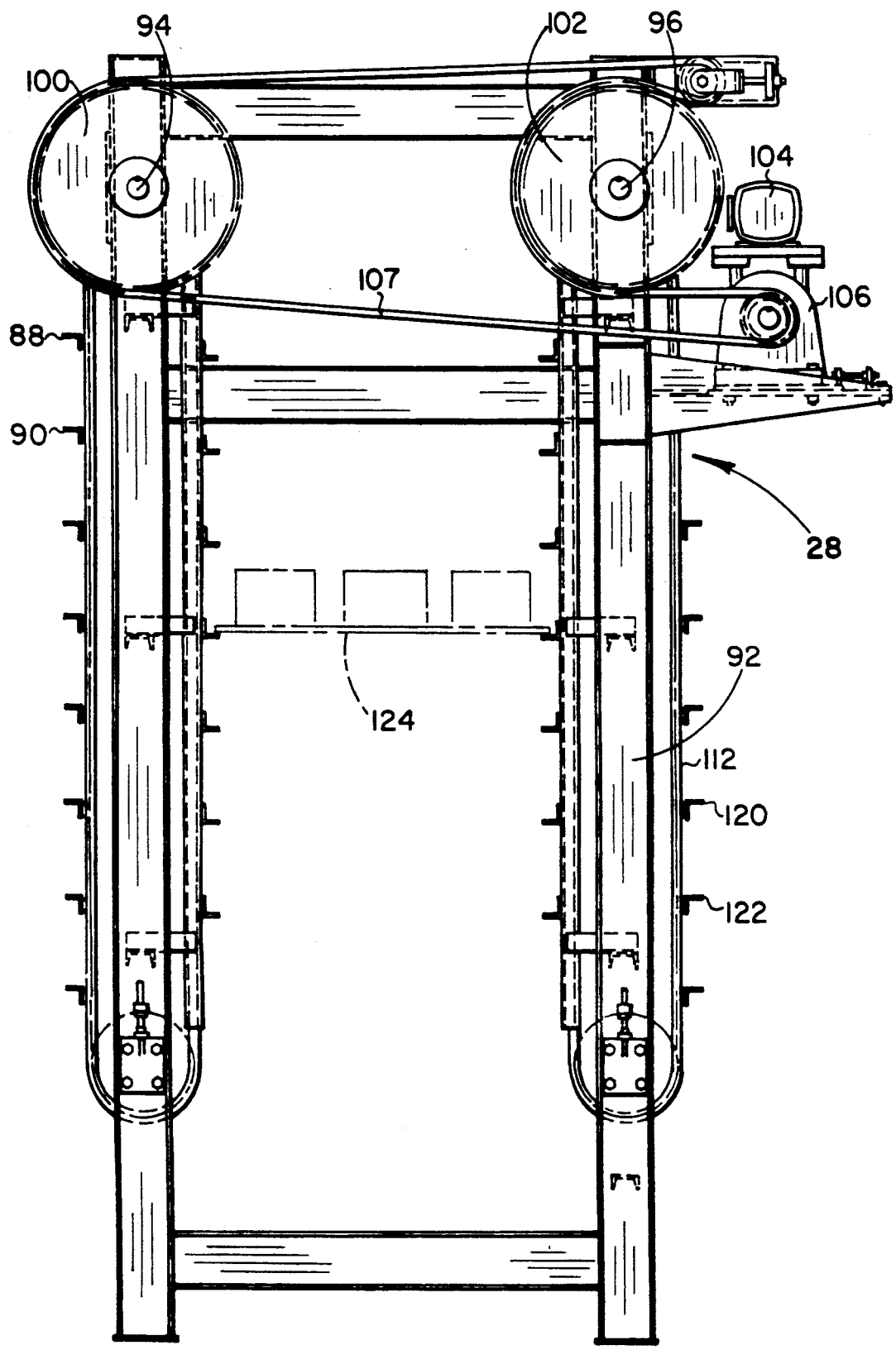
FIG. 4 is an enlarged view of the stacker taken along line 4—4 in FIG. 2.

Pallet stacker 28 includes a plurality of vertically spaced brackets, like brackets 88, 90 for supporting pallets bearing uncured block. FIG. 4 illustrates, in dashed lines, a single pallet bearing blocks supported by the brackets on pallet stacker 28. As will be described hereinafter, the pallet stacker vertically lifts pallets, via the stacker brackets, from conveyor 22 into a vertical stack supported by the stacker.

Figure 3:
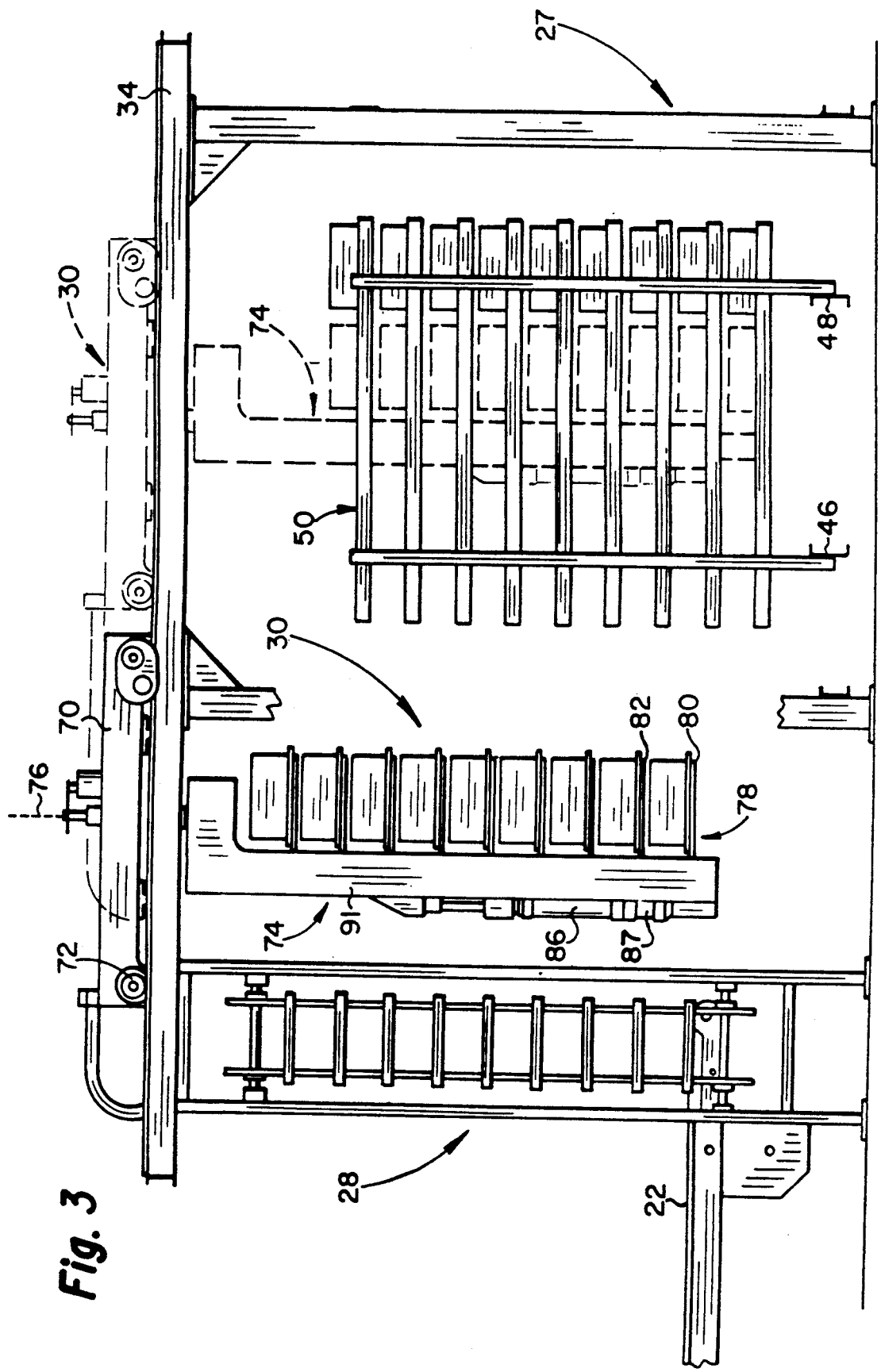
FIG. 3 is a view similar to FIG. 2 illustrating the loader transporting block removed from the stacker to a rack.

In FIG. 3, spade tree assembly 74 is pivoted 180° about axis 76 and is shown in dashed line configuration depositing a vertical stack of pallets bearing uncured block into a bay in rack 50. A side channel 91 comprises the side channel opposite side channel 84 in FIG. 3.

Turning now to FIGS. 4-6, further description will be made of pallet stacker 28. The pallet stacker includes an upright frame 92 having a pair of main shafts 94, 96 rotatably mounted on frame 92. An idler shaft 98 (in FIG. 5) is also rotatably mounted on frame 92 beneath main shaft 96. A corresponding idler shaft (not visible) is rotatably mounted on the frame directly beneath shaft 94. Main sprockets 100, 102 are fixedly mounted on shafts 94, 96, respectively. A three-phase motor 104 drives a speed reducer 106 which in turn imparts rotary motion to shafts 94, 96 via a chain 107.

Sprockets 108, 110 are fixedly mounted on shafts 96, 98, respectively (in FIG. 5), and drive an endless chain 112. Similarly, sprockets 114, 116 drive endless chain 118. A plurality of angle brackets, like brackets 120, 122 are fixedly mounted across chains 112, 118. Corresponding sprockets, chains and brackets are mounted on main shaft 94 and the idler shaft therebeneath.

In operation, and with reference to FIG. 2 as well as FIGS. 4-6, a pallet loaded with bricks moves toward stacker 28 on conveyor 22. The conveyor stops when the pallet is received within frame 92. Motor 104 drives thereby moving the angle brackets on the interior portion of the endless chains upwardly. The pallet, like pallet 124 shown in dot-dash lines in FIG. 4, is thus raised upwardly.

Figure 9:
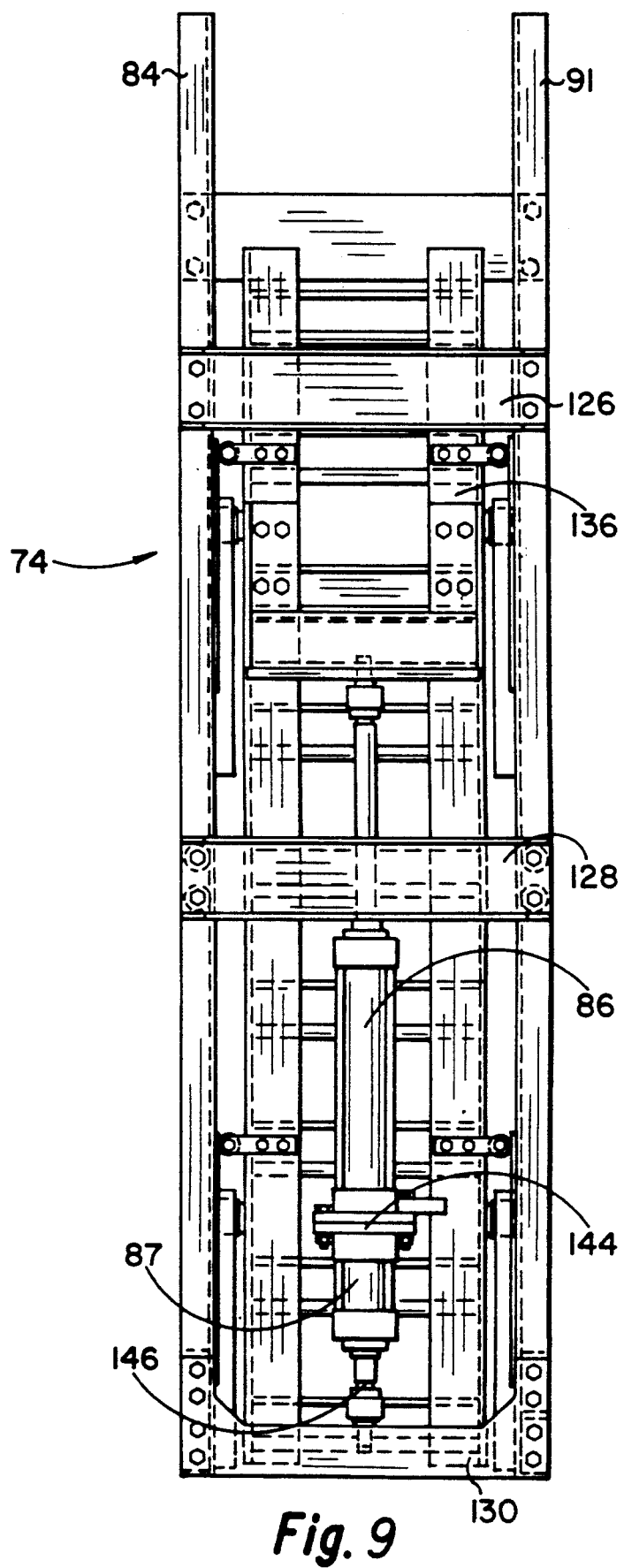
FIG. 9 is a rear elevational view of the spade assembly of FIG. 7.

Turning now to FIGS. 7-9, illustrated in more detail is spade tree assembly 74 from FIGS. 2 and 3. Side channels 84, 91 are tied together via bars 126, 128 and by a bottom cylinder yolk 130. Bar 128 is spaced apart from side channels 84, 91, by spacers, two of which are spacers 132, 134.

Spade tree 78 comprises a frame 136 upon which spades, like spades 80, 82, 138 are fixedly mounted. Ram 86 includes a rod 140 which is connected via a coupler 142 to frame 136 of spade tree 78.

The ends of rams 86, 87 are bolted together via a flange coupling 144. Ram 87 includes a rod 146 (in FIG. 9) which is connected to bottom cylinder yolk 130. In the drawings of FIGS. 7-9, ram 86 is in its extended condition and ram 87 is in its extended condition.

Generally describing the operation of spade tree assembly 74, when ram 86 contracts, spade tree 78 lowers relative to side channels 84, 91. The spade tree assembly is shown in dashed-line configuration in FIG. 3 in its lowered position. When ram 87 extends, the spade tree assembly is shifted upwardly, in the present embodiment of the invention, approximately 2". The cylinder stroke for ram 86 is approximately 14¼". Thus, with spade tree assembly 74 in the configuration illustrated in solid lines in FIG. 2, i.e., with ram 86 extended, assembly 74 can drive so that the spades, like spades 80, 82, 138 are each under a corresponding pallet in stacker 28 as shown in the dashed-line configuration of assembly 74. When so configured, cylinder 87 extends thereby raising the spade tree approximately 2 inches relative to side channels 84, 91 and lifting the pallet from the brackets in the stacker. The reverse of this process occurs in the cured block station to load unstacker 36.

To load rack 50, spade tree assembly pivots 180° about axis 76 in a manner which will be described in more detail hereinafter, and advances toward the rack as shown in FIG. 3. When ram 86 contracts to the dashed-line configuration of spade tree assembly 74, the pallets are in position to be loaded into the rack. When ram 87 contracts, the spades move to their lowermost position and deposit the pallets on the rack. The reverse of this process occurs in cured block station 29 to unload the rack.

Figure 10:
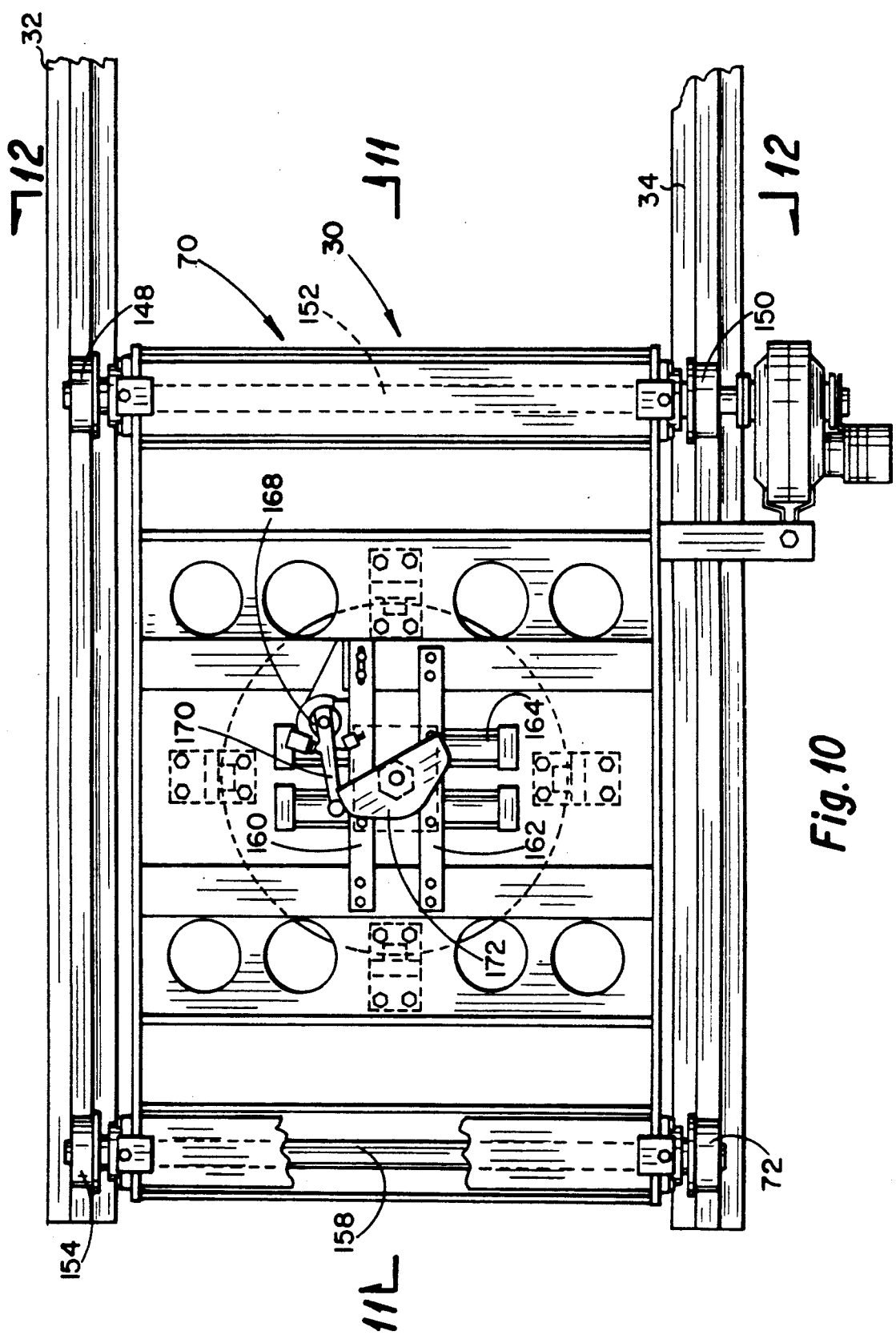
FIG. 10 is an enlarged top plan view of the loader of FIGS. 2 and 3.
Figure 11:
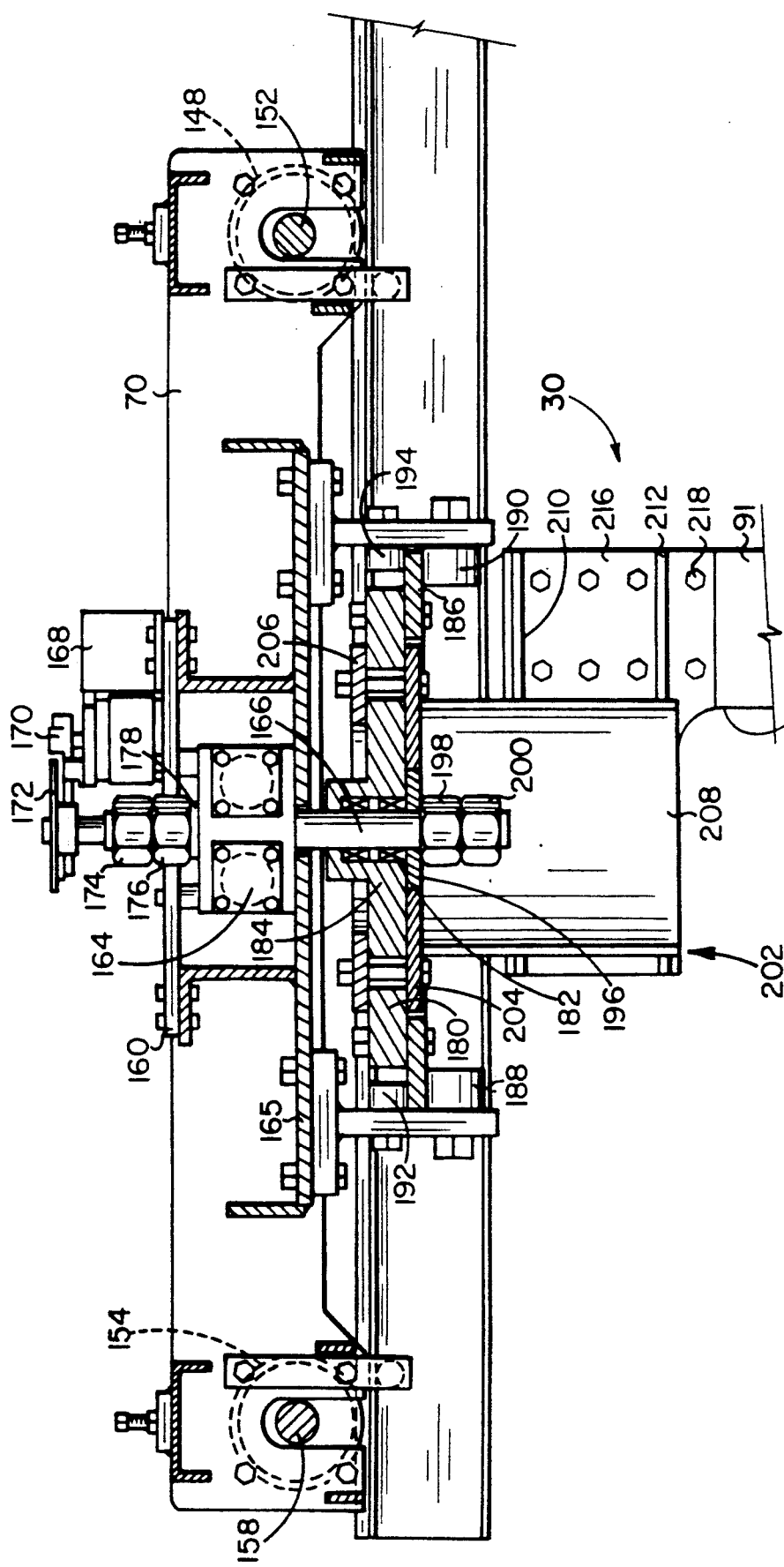
FIG. 11 is a slightly enlarged view taken along line 11—11 in FIG. 10.
Figure 12:
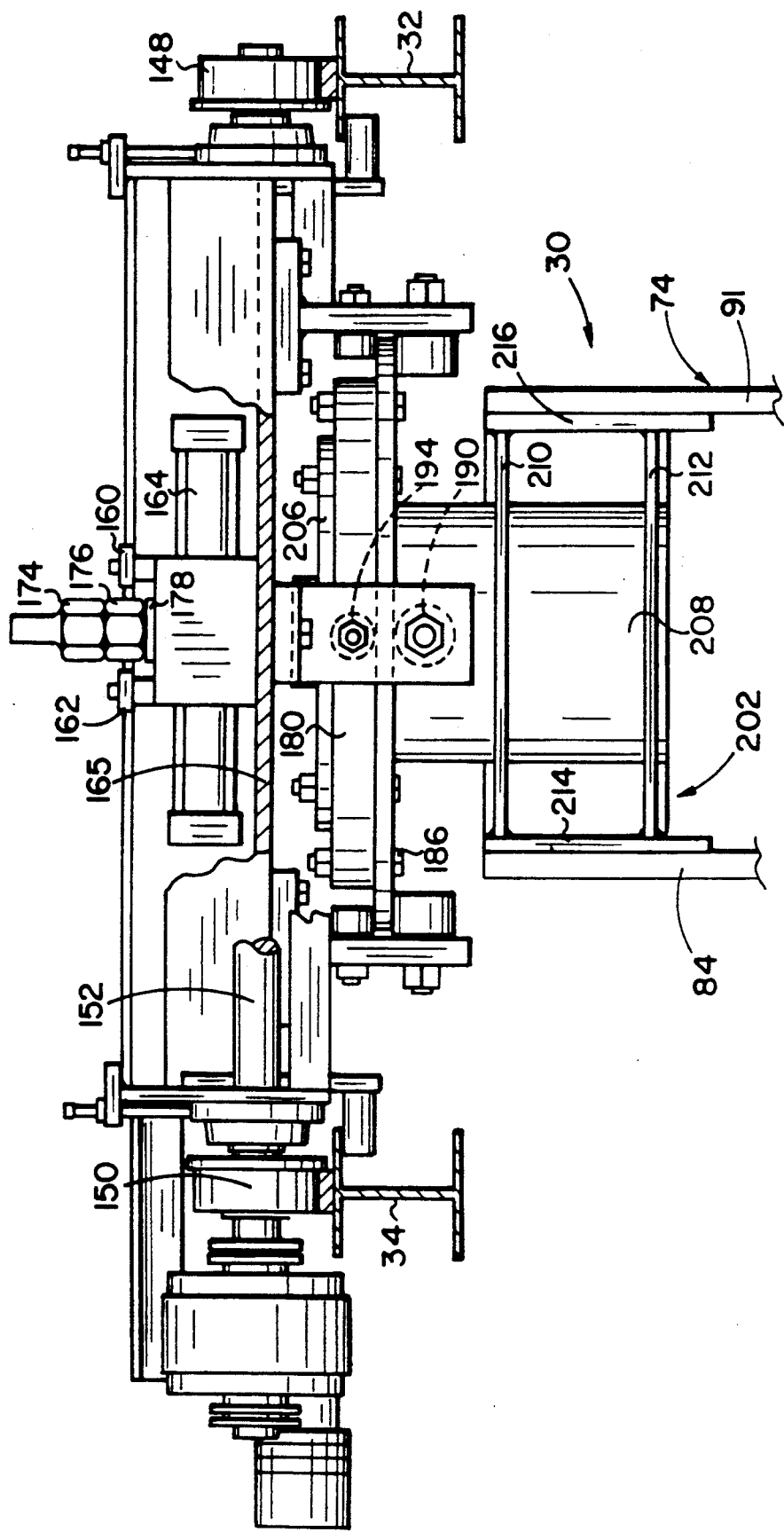
FIG. 12 is a slightly enlarged view taken along line 12—12 in FIG. 10 with part of the structure broken away to facilitate viewing the rotary actuator.

Considering now further the structure of loader 30, previously identified structure retains the same numeral in FIGS. 10-12. Wheels 148, 150 are mounted on a drive shaft 152 which in turn is mounted on carriage 70 for rotation about its axis. Wheels 154, 72 are mounted on an idler shaft 158 which is also mounted on carriage 70 for rotation about its axis.

A pair of actuator mounting bars 160, 162 are secured to carriage 70 via bolts as shown. A hydraulic rotary actuator 164 is mounted on bars 160, 162 and operates in a known manner to impart action to a pivot shaft 166. Actuator 164 is supported on a carriage plate 165, viewable both in FIG. 11 and 12. A rotary valve assembly 168 is operably connected to actuator 164 via conventional hydraulics (not shown). The FIG. 12 view of unloader 30 is shown without rotary valve assembly 168 mounted thereon. Rotary valve assembly 168 controls hydraulic fluid flow to rotary actuator 164 responsive to movement of a cam follower arm 170. Movement of cam follower arm 170 is controlled by a valve cam 172 which is mounted on pivot shaft 166. The speed of rotation imparted to shaft 166 by actuator 164 thus varies dependent upon the radial position of shaft 166.

A pair of bolts 174, 176 are threadably engaged with a threaded portion (not visible) of shaft 166 at the upper end thereof. A washer 178 is disposed between bolt 176 and an upper planar surface of rotary actuator 164.

As best viewed in FIG. 11, shaft 166 extends beneath plate 165 through a bore in the plate. A drive ring 180 is fixedly mounted on shaft 166 via locking assembly 182 (in FIG. 11). The drive ring comprises a substantially circular plate having a central hub 184 having a bore through which shaft 166 is received as shown. An annular track ring 186 is bolted on the radially outer under surface of drive ring 180 via a plurality of bolts, two of which are visible in FIG. 11. Ring 186 is split into two substantially equal portions along the diameter of the ring. When bolted to the underside of drive ring 180 as illustrated in FIG. 11, the ring provides a substantially continuous annular track against which rollers 188, 190 ride on the lower side and rollers 192, 194 ride on the upper side of ring 186. Rollers 188, 190 are mounted on brackets which extend downwardly from plate 165. The rollers are mounted via conventional eccentric mounts which permit each roller to be pivoted downwardly so that it no longer bears against the underside of ring 186.

An annular pilot ring 196 is received over shaft 166 with nuts 198, 200 being threadably secured to a threaded portion (not visible) of shaft 166 directly beneath ring 196.

A spade assembly attachment bracket 202 includes an upper annular plate 204 which is secured to drive ring 180 via a clamp ring 206 and a plurality of bolts and associated nuts, two of which are shown in FIG. 11. The bolts extend through bores in ring 180 as shown.

Bracket 202 further includes a tubular downwardly-extending portion 208 which has an upper end welded to plate 204. Portion 208 is received through upper and lower plates 210, 212 which have a pair of side-channel mounting plates 214, 216 welded to the edges thereof. A plurality of bolts, like bolt 218 in FIG. 11, secure side channel 91 to plate 216. A similar series of bolts (not visible in FIG. 11) secure plate 214 to side channel 84. Spade tree assembly 74 is thus secured to bracket 208.

In operation, it is necessary to rotate spade tree assembly 74 in the loading and unloading of block as described above. When necessary to do so, hydraulic fluid is provided to rotary valve 168 and therefrom to rotary actuator 164 which pivots shaft 166. Cam 172 regulates speed of rotation by controlling flow through valve 168 in a known manner. When shaft 166 rotates, plate 180 likewise turns thus imparting rotary motion to bracket 202 which is bolted to the plate as shown in FIG. 11. Wear ring 186 travels on rollers 188, 190 and on substantially identical rollers spaced at 90° intervals from rollers 188, 190, viewable in FIG. 12. The rollers, like rollers 192, 194, which bear against the upper surface of ring 186 stabilize spade tree assembly 74 during acceleration and deceleration of carriage 70. Very little wobbling of the spade tree assembly occurs as carriage travel starts and stops because of the manner in which drive ring 180 is mounted on the carriage, namely a central support via nuts 198, 200 on the pivot pin and support via rollers on the upper and lower surfaces of the wear ring about the diameter of the ring.

When it is necessary or desireable to replace the wear ring or any of the upper or lower rollers riding thereagainst, the eccentric mounts which secure the lower rollers, like rollers 188, 190, are loosened and the rollers pivoted downwardly from the lower surface of ring 186. The bolts securing ring 186 to drive ring 180 are removed thus permitting removal of each half of the wear ring from the drive plate. In the case of a worn or damaged wear ring, a new wear ring may be bolted thereon and the roller resecured in the position shown in FIGS. 11 and 12.

When the lower rollers are so removed, all of the weight of spade tree assembly 74 is born on nuts 198, 200 on the lower end of pivot shaft 166. When the rollers are resecured, the relative position of the rollers, like rollers 188, 190 and nuts 198, 200 is adjusted to cause the majority of the weight of the spade tree assembly to bear against the rollers as opposed to nuts 198, 200.

In the event of damage to pivot shaft 166, valve cam 172 is removed as are nuts 198, 200. Pivot shaft 166 is then withdrawn from rotary actuator 164 for inspection, repair or replacement. When the pivot shaft is so removed, all of the weight of spade tree assembly 74 is born on the rollers bearing on the under side of wear ring 186, like rollers 188, 190. When pivot shaft 166 is replaced as shown in FIG. 11, tension on nuts 198, 200 is adjusted to assure that the majority of the weight of the spade tree assembly is born by the rollers.

Consideration will now be given to a prior art device for supporting a spade tree assembly on a carriage in an automated block factory. Indicated generally at 220 is a prior art transfer carriage for supporting a spade tree assembly for lateral and rotational movement. Carriage 220 includes an idler shaft 222 having wheels 224, 226 mounted on either end thereof for facilitating movement along a pair of rails (not shown) like rails 32, 34. Rotary actuator 228 and a valve 230 are mounted on the carriage. An actuator shaft 232 extends upwardly from actuator 228 and includes a valve cam 234 mounted thereon. A cam follower arm 236 controls the flow of hydraulic fluid from valve 230 to actuator 228 thus controlling the speed of rotation of actuator 228. A bearing ring assembly 238 is mounted on the lower end of actuator 228.

Figure 14:
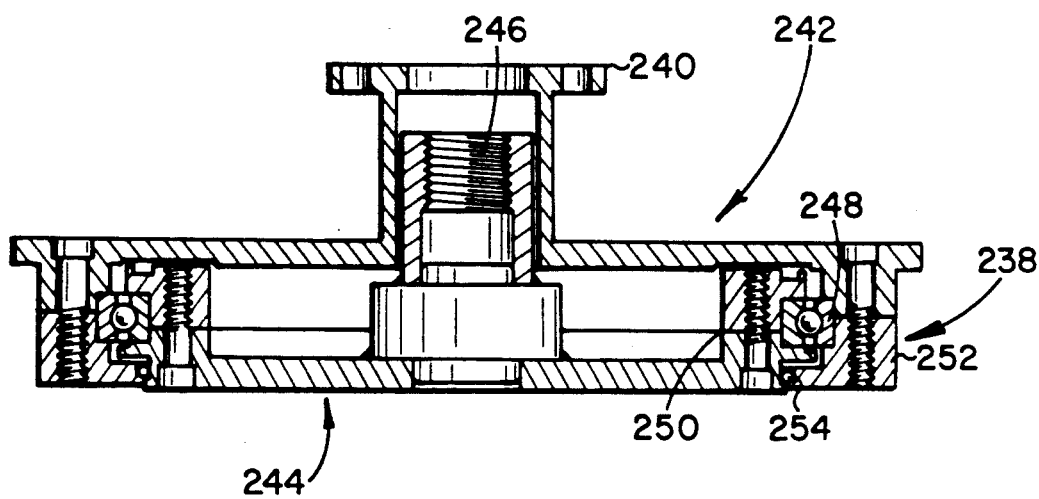
FIG. 14 is an enlarged sectional view of the bearing ring assembly of the loader shown in FIG. 13.
Figure 13:
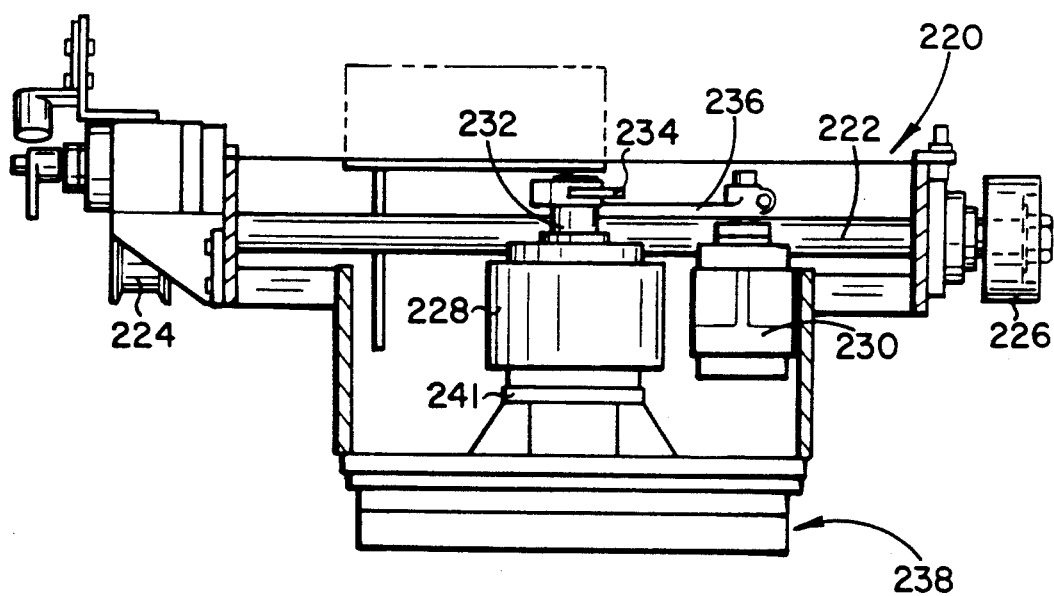
FIG. 13 is a view similar to FIG. 12 of a portion of a prior art loader.

Attention is directed to FIG. 14 for a more detailed view of bearing ring assembly 238. The bearing ring assembly includes a flange 240 for bolting assembly 238 to the under side of actuator 228. Flange 240 comprises a portion of a top plate assembly 242 which remains stationary relative to carriage 220. A drive plate assembly 244 rotates relative to assembly 242 under action of the rotary actuator shaft (not shown in FIG. 14) which engages with threads 246 in the drive plate assembly.

A ball bearing 248 is retained in position by inner and outer bearing caps 250, 252, respectively. An o-ring 254 seals ball bearing 248 from contamination.

Ball bearing 248 has an inner diameter of 12" and an outer diameter of 14" and a width of 1". A plurality of bores (not shown) in drive plate assembly 244 are provided for bolting a spade tree assembly (also not shown) thereto.

The prior art bearing ring assembly does not provide the stability of the spade tree assembly support in the present invention nor does it permit replacement of wear parts, like the ball bearing, without removal of the spade tree assembly. The present invention may also be implemented and maintained at lower cost because of the expense of large ball bearings like that utilized in the prior art.

Having illustrated and described the principles of my invention in a preferred embodiment thereof, it should be readily apparent to those skilled in the art that the invention can be modified in arrangement and detail without departing from such principles.

I claim all modifications coming within the spirit and scope of the accompanying claims:

1. Apparatus for moving a plurality of pallets loaded with building blocks and being supported in a vertical stack in parallel relation to one another, said apparatus comprising:
   a spade assembly having a plurality of laterally extending spades one above the other, said spades being constructed to support and lift said pallets when each spade is positioned under a corresponding pallet and the spade assembly is shifted upwardly;
   a transfer carriage mounted on a track above said spade assembly for lateral shifting movement;
   means for suspending said spade assembly from said transfer carriage;
   a pivot shaft mounted on said transfer carriage and having a vertical axis, said shaft having a driving end connected to said spade assembly for pivoting the same about a vertical axis; and
   means for allowing removal of said shaft while said spade assembly remains suspended from said transfer carriage.

2. The apparatus of claim 1 wherein said suspending means comprises:
   roller means mounted on said transfer carriage; and
   a wear ring mounted on said spade assembly and riding on said roller means.

3. The apparatus of claim 2 wherein said apparatus further includes a substantially planar, circular drive ring mounted on said shaft coaxially therewith and having a central bore through which said shaft is received.

4. The apparatus of claim 3 wherein said wear ring is mounted on the underside of said drive ring and wherein said apparatus further includes second roller means bearing against an upper surface of said wear ring for preventing said spade assembly from wobbling during transfer carriage movement.

5. The apparatus of claim 2 wherein said wear ring comprises an arcuate bearing track concentric with said shaft and wherein the majority of the weight of said spade assembly is supported on said roller means.

6. The apparatus of claim 5 wherein said wear ring is split into two portions.

7. The apparatus of claim 6 wherein said apparatus further includes means for removing said roller means from the underside of said wear ring for allowing removal of said spade assembly remains suspended from said transfer carriage.

8. Apparatus for moving a plurality of pallets loaded with building blocks and being supported in a vertical stack in parallel relation to one another, said apparatus comprising:
- a spade assembly having a plurality of laterally extending spades one above the other, said spades being constructed to support and lift said pallets when each spade is positioned under a corresponding pallet and the spade assembly is shifted upwardly;
- a transfer carriage mounted on a track above said spade assembly for lateral shifting movement;
- means for suspending said spade assembly from said transfer carriage;
- means for pivoting said spade assembly about a vertical axis;
- roller means mounted on said transfer carriage;
- a wear ring mounted on said spade assembly and riding on said roller means; and
- means for allowing removal of said wear ring while said spade assembly remains suspended from said transfer carriage.

9. The apparatus of claim 8 wherein said suspending means comprises:
- a pivot shaft; and
- means for securing said spade assembly to said pivot shaft.

10. The apparatus of claim 9 wherein said apparatus further includes a substantially planar, circular drive ring mounted on said shaft coaxially therewith and having a central bore through which said shaft is received.

11. The apparatus of claim 10 wherein said wear ring is mounted on the underside of said drive ring and wherein said apparatus further includes second roller means bearing against an upper surface of said wear ring for preventing said spade assembly from wobbling during transfer carriage movement.

12. The apparatus of claim 9 wherein said wear ring comprises an arcuate bearing track concentric with said shaft and wherein the majority of the weight of said spade assembly is supported on said roller means.

13. The apparatus of claim 12 wherein said wear ring is split into two portions.

14. The apparatus of claim 9 wherein said apparatus further includes means for allowing removal of said shaft while said spade assembly remains suspended from said transfer carriage.

15. Apparatus for moving a plurality of pallets loaded with building blocks and being supported in a vertical stack in parallel relation to one another, said apparatus comprising:
- a spade assembly having a plurality of laterally extending spades one above the other, said spades being constructed to support and lift said pallets when each spade is positioned under a corresponding pallet and the spade assembly is shifted upwardly;
- a transfer carriage mounted on a track above said spade assembly for lateral shifting movement;
- a pivot shaft mounted on said transfer carriage for rotation about a vertical axis;
- a drive ring mounted on said pivot shaft and rotating therewith;
- a wear ring mounted on the underside of said drive ring;
- roller means mounted on said transfer carriage, said wear ring being supported on said roller means; and
- means for allowing removal of said wear ring while said spade assembly remains supported by said pivot shaft.

16. The apparatus of claim 15 wherein said wear ring comprises an arcuate bearing track concentric with said shaft and wherein the majority of the weight of said spade assembly is supported on said roller means.

17. The apparatus of claim 16 wherein said wear ring is split into two portions.

18. The apparatus of claim 15 wherein said apparatus further includes means for allowing removal of said pivot shaft while said spade assembly remains supported by said roller means.

19. Apparatus for moving a plurality of pallets loaded with building blocks and being supported in a vertical stack in parallel relation to one another, said apparatus compromising:
- a spade assembly having a plurality of laterally extending spades one above the other, said spades being constructed to support and lift said pallets when each spade is positioned under a corresponding pallet and the spade assembly is shifted upwardly;
- a transfer carriage mounted on a track above said spade assembly for lateral shifting movement;
- a pivot shaft mounted on said transfer carriage for rotation about a vertical axis;
- a drive ring mounted on said pivot shaft and rotating therewith;
- a wear ring mounted on the underside of said drive ring;
- roller means mounted on said transfer carriage, said wear ring being supported on said roller means; and
- means for allowing removal of said pivot shaft while said spade assembly remains supported by said roller means.

20. The apparatus of claim 19 wherein said wear ring comprises an arcuate bearing track concentric with said shaft and wherein the majority of the weight of said spade assembly is supported on said roller means.

21. The apparatus of claim 20 wherein said wear ring is split into two portions.

22. The apparatus of claim 19 wherein said apparatus further includes means for allowing removal of said wear ring while said spade assembly remains supported by said pivot shaft.

* * * * *